(12) United States Patent
Nauze et al.

(10) Patent No.: US 9,582,493 B2
(45) Date of Patent: Feb. 28, 2017

(54) LEMMA MAPPING TO UNIVERSAL ONTOLOGIES IN COMPUTER NATURAL LANGUAGE PROCESSING

(71) Applicant: Oracle International Corporation, Redwood Shores, CA (US)

(72) Inventors: Fabrice Nauze, Amsterdam (NL); Geert Kloosterman, Amstelveen (NL); Albert Derk Eduard Vedelaar, Sleidrecht (NL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/793,658

(22) Filed: Jul. 7, 2015

(65) Prior Publication Data

US 2016/0132487 A1 May 12, 2016

Related U.S. Application Data

(60) Provisional application No. 62/077,868, filed on Nov. 10, 2014, provisional application No. 62/077,887, filed on Nov. 10, 2014.

(51) Int. Cl.
*G06F 17/27* (2006.01)
*G06F 17/28* (2006.01)
*G06F 17/30* (2006.01)

(52) U.S. Cl.
CPC ........ *G06F 17/277* (2013.01); *G06F 17/2735* (2013.01); *G06F 17/2755* (2013.01);
(Continued)

(58) Field of Classification Search
CPC ............... G06F 17/504; G06F 17/2818; G06F 17/2881; G06F 17/30864; G06F 12/0607
(Continued)

(56) References Cited

U.S. PATENT DOCUMENTS 7,797,303 B2 * 9/2010 Roulland .......... G06F 17/30654
707/708
8,204,751 B1 6/2012 Di Fabbrizio et al.
(Continued)

FOREIGN PATENT DOCUMENTS

EP 927939 A1 7/1999
WO 2016077015 5/2016
WO 2016077016 5/2016

OTHER PUBLICATIONS

Bretschneider, et al. "Corpus-based Translation of Ontologies for Improved Multilingual Semantic Annotation", Proceedings of the third workshop on semantic web and information extraction, Aug. 24, 2014, pp. 1-8.
(Continued)

*Primary Examiner* — Charlotte M Baker
(74) *Attorney, Agent, or Firm* — Kilpatrick Townsend & Stockton LLP

(57) ABSTRACT

A method of mapping ontologies between languages may include receiving a first ontology in a first language, where the first ontology includes a first plurality of lemmas and a plurality of relationships between the plurality of lemmas. The method may also include receiving a second plurality of lemmas in a second language, and mapping each of the second plurality of lemmas in the second language to a respective lemma in the first plurality of lemmas in the first language. The method may additionally include generating a second ontology in the second language by using the plurality of relationships in the first ontology to create relationships between the second plurality of lemmas in the second language.

20 Claims, 12 Drawing Sheets

(52) U.S. Cl.
CPC .......... *G06F 17/2775* (2013.01); *G06F 17/28* (2013.01); *G06F 17/30734* (2013.01)

(58) Field of Classification Search
USPC ................ 704/4, 9; 707/708, 713, 707, 724
See application file for complete search history.

(56) References Cited

U.S. PATENT DOCUMENTS

| | | | |
|---|---|---|---|
| 8,423,350 B1 | 4/2013 | Chandra et al. | |
| 2006/0122834 A1 | 6/2006 | Bennett | |
| 2007/0130194 A1 | 6/2007 | Kaiser | |
| 2011/0087670 A1 | 4/2011 | Jorstad et al. | |
| 2013/0260358 A1 | 10/2013 | Lorge et al. | |
| 2014/0278362 A1 | 9/2014 | Gerken, III et al. | |
| 2015/0309992 A1* | 10/2015 | Visel | G06F 17/2785 704/9 |
| 2015/0347543 A1* | 12/2015 | Sinha | G06F 17/3053 707/707 |
| 2016/0132482 A1 | 5/2016 | Salome et al. | |
| 2016/0132484 A1 | 5/2016 | Nauze et al. | |
| 2016/0163312 A1 | 6/2016 | Henton et al. | |
| 2016/0188570 A1 | 6/2016 | Lobez Comeras et al. | |

OTHER PUBLICATIONS

Espinoza, et al. "Ontology Localization", Proceedings of the Fifth International Conference on Knowledge Capture, K-Cap-09, Sep. 4, 2009, p. 33.

Vossen, et al. "KYOTO: an open platform for mining facts" In: "Handbook of Research on Culturally-Aware Information Technology", Aug. 31, 2010, IGI Global, 1-10.

International Search Report and Written Opinion of PCT/US2015/055490 mailed on Jan. 21, 2016, all pages.

International Search Report and Written Opinion of PCT/US2015/055489 mailed on Jan. 25, 2016, all pages.

U.S. Appl. No. 14/793,677, Non-Final Office Action mailed on Sep. 20, 2016, 5 pages.

U.S. Appl. No. 14/793,701, Non-Final Office Action mailed on Aug. 5, 2016, 7 pages.

\* cited by examiner

LEMMA MAPPING TO UNIVERSAL ONTOLOGIES IN COMPUTER NATURAL LANGUAGE PROCESSING

CROSS REFERENCES

This application claims the benefit of U.S. Provisional Application No. 62/077,868 filed on Nov. 10, 2014 entitled "Automatic Batch Generation of Concept Relations from N-Grams from Linguistic Input Data." This application also claims the benefit of U.S. Provisional Application No. 62/077,887 filed on Nov. 10, 2014 entitled "Lemma Mapping to Universal Ontologies." Each of these applications is hereby incorporated herein by reference for all purposes.

The following three applications are related to each other and are filed on the same date of Jul. 6, 2015: U.S. Ser. No. 14/7793,677 filed on Jul. 7, 2015 entitled "Automatic Generation of N-Grams and Concept Relations From Linguistic Input Data" to Fabrice Nauze et al.; U.S. Ser. No. 14/793,701 filed on Jul. 7, 2015 entitled "Automatic Ontology Generation for Natural-Language Processing Applications" to Margaret Salome et al.; and U.S. Ser. No. 14/793,658 filed on Jul. 7, 2015 entitled "Lemma Mapping to Universal Ontologies in Computer Natural-Language Processing" to Fabrice Nauze et al. Each of these applications are hereby incorporated by reference.

BACKGROUND

In a general sense, an ontology is the philosophical study of basic concepts and their relations to each other. Ontology's deal with questions concerning what entities can be said to exist, how such entities can be logically grouped together in a hierarchy, and what similarities and/or differences can be used to segregate ontological concept groups from each other. In computer and information science, the general ontology translates into a naming and definition of types, properties, and relationships that fundamentally exist in a particular computing domain. For example, an ontology can compartmentalize variables needed for a set of computations and establish relationships between those variables.

BRIEF SUMMARY

In one embodiment, a method of mapping ontologies between languages may include receiving a first ontology in a first language, where the first ontology includes a first plurality of lemmas and a plurality of relationships between the plurality of lemmas. The method may also include receiving a second plurality of lemmas in a second language, and mapping each of the second plurality of lemmas in the second language to a respective lemma in the first plurality of lemmas in the first language. The method may additionally include generating a second ontology in the second language by using the plurality of relationships in the first ontology to create relationships between the second plurality of lemmas in the second language.

In another embodiment, a non-transitory computer-readable medium may be presented. The computer-readable memory may comprise a sequence of instructions which, when executed by one or more processors, causes the one or more processors to perform operations including receiving a first ontology in a first language, where the first ontology is comprised of a first plurality of lemmas and a plurality of relationships between the plurality of lemmas. The operations may also include receiving a second plurality of lemmas in a second language, and mapping each of the second plurality of lemmas in the second language to a respective lemma in the first plurality of lemmas in the first language. The operations may additionally include generating a second ontology in the second language by using the plurality of relationships in the first ontology to create relationships between the second plurality of lemmas in the second language.

In yet another embodiment, a system may be presented. The system may include one or more processors and a memory communicatively coupled with and readable by the one or more processors. The memory may comprise a sequence of instructions which, when executed by the one or more processors, cause the one or more processors to perform operations including receiving a first ontology in a first language, where the first ontology is comprised of a first plurality of lemmas and a plurality of relationships between the plurality of lemmas. The operations may also include receiving a second plurality of lemmas in a second language, and mapping each of the second plurality of lemmas in the second language to a respective lemma in the first plurality of lemmas in the first language. The operations may additionally include generating a second ontology in the second language by using the plurality of relationships in the first ontology to create relationships between the second plurality of lemmas in the second language.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
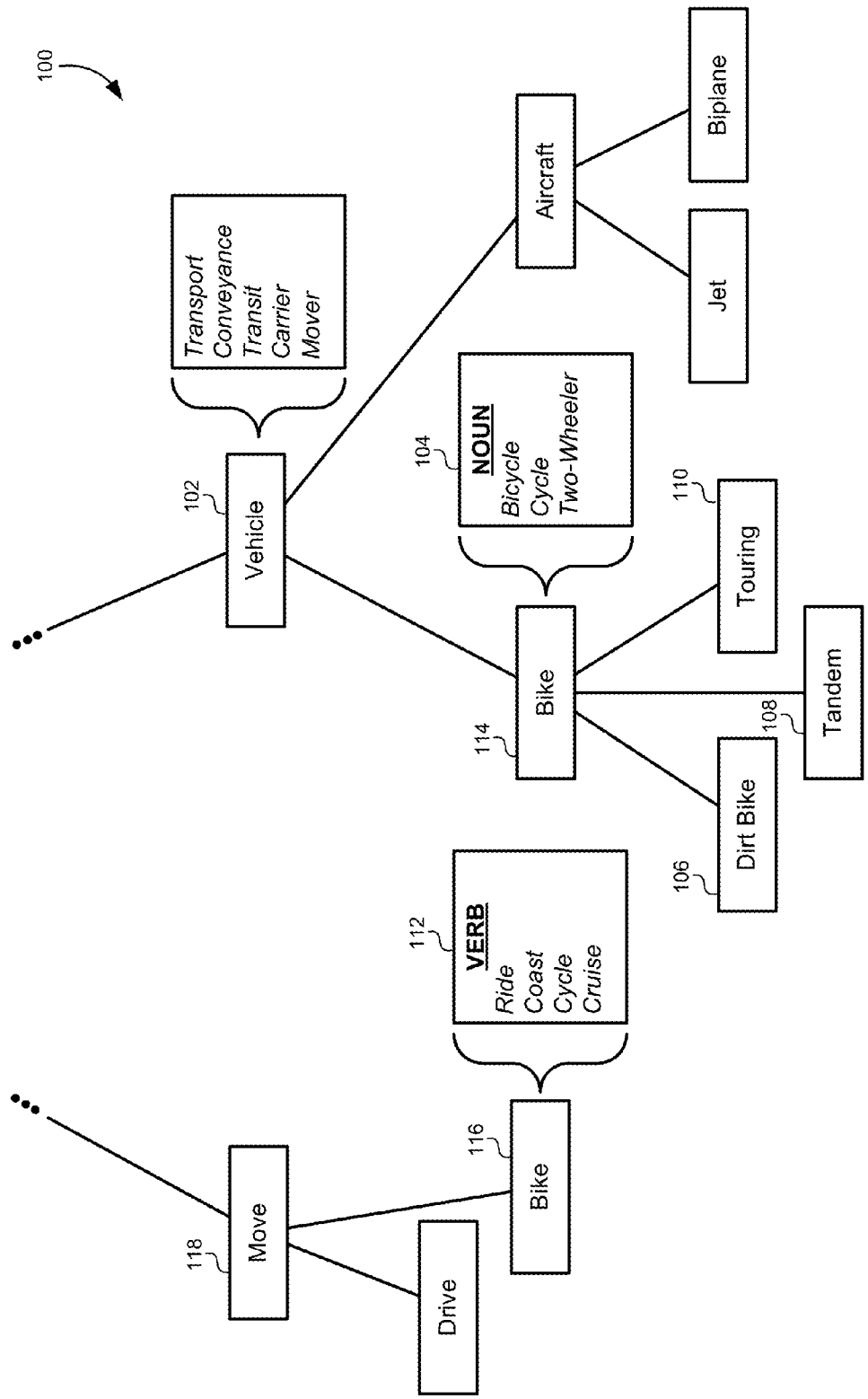
FIG. 1 illustrates a diagram of an ontology for use in natural language processing, according to some embodiments.

Ontologies, hierarchies, and taxonomies are often used in search systems and information retrieval systems in general to improve recall. Knowing for instance that "BMW" is a "car brand" can improve recall in search tasks, increase precision in classification tasks, and so forth. Ontologies are usually built as language-specific modules, first linking word forms to lemmas, and then linking lemmas to other lemmas with ontological/hierarchical relationships. However, as described herein, the relationships linking lemmas together in an ontology can be abstracted into a largely language-independent module. In the embodiments described herein, a method to achieve this abstraction is presented such that an ontology can be formed in a second language based on an existing ontology in a first language.

In some embodiments, a process may begin by selecting or defining a first ontology. This first ontology, referred to as a "ground truth," or "universal" ontology can be formed in a lingua franca, such as English. This first ontology may describe relationships between concepts coded as lemmas. The process may then utilize a linguistic analysis pipeline that is triggered after the segmentation/tokenization of an input corpus, a part-of-speech analysis, and a lemmatization of its tokens. This process can then define a mapping between lemmas (and optionally their part-of-speech) in the first ontology to a lemma in the second ontology. By using the universal ontology to map lemmas and relationships for each language, the time needed to implement a new language ontology is minimized, and the overall quality across languages can be improved because the quality of the ontology is not tied to the work of the person coding relationships in a particular language.

In some embodiments, the process can build a language-independent ontology as the first ontology. The first ontology includes relations between concepts coded as lemmas. For instance, a "tandem" is a "bicycle", and a "bicycle" is a "vehicle". Next, the process can receive a selection of a second language that is different from the first language of the first ontology. The second language may be a desired language for the second ontology. Next, the process can generate a mapping between words in the first language and the second language. The process can also utilize a database that maps common meanings across languages. This mapping can either be generic, such that a word in the first language is mapped to a corresponding word in the second language, or can be more specific such that mappings between parts-of-speech (PoS) are facilitated. For example, a generic mapping may result in "lemma(second language) →lemma(first language)," while a part-of-speech-specific mapping may result in "PoS+lemma(second language) →lemma(first language)."

After mapping lemmas between the first language in the second language, the mapped lemmas can be passed on to the next step in the language analysis pipeline. Specifically, the relationships between lemmas in the first ontology can then be mapped directly using the relationships between lemmas in the second ontology. In essence, the relationships defined in the first ontology are used to link together lemmas in the second ontology to form corresponding relationships. The process automatically creates word-to-word mappings between the two ontologies, and then uses those mappings to establish relationships in the second ontology. In this manner, the first ontology is used as a template for the second ontology, with words from the second language filling in the nodes between relationships in the template. Thus, users do not need to manually assign relationships or determine a vocabulary for the second ontology.

This process can also be constantly updated over time. The first ontology may be associated with a particular corpus, such as a website or web domain. As the corpus changes over time (e.g. the webpages are updated), the first ontology may also change in the first language. New vocabulary may be added, old vocabulary may be removed, and relationships may be adjusted. When this happens, new vocabulary in the second language can be added to the second ontology or deprecated vocabulary can be removed from the second ontology. Relationships can also be adjusted in the second ontology according to adjusted relationships in the first ontology. This automated process can generate a plurality of language-specific ontologies based on the first ontology that are automatically kept up-to-date.

FIG. 1 illustrates a diagram 100 of an ontology for use in natural language processing, according to some embodiments. Diagram 100 can represent the universal ontology that groups concepts together by meaning and relates those concepts to other concepts through relationships. For example, a bike 114 may represent the concept of a two wheeled, manually powered vehicle. The ontology may also include a list of other words, or synonyms 104, that describe the same concept of a bike 114. The bike 114 may be related to other concepts in a hierarchical fashion. For example, the bike 114 is a vehicle 102, which also has set of synonyms that can be used to express the concept of a vehicle 102. The parent-child relationship in the hierarchy represents an "is a type of" relationship between the parent and the child. As another example, a dirt bike 106, a tandem bike 108, and a touring bike 110 are all types of the parent node representing a bike 114.

The universal ontology is built using concepts represented by one or more words. Is important to note, however, that individual words—particularly in the English language—may represent multiple concepts. In one example, the term "bike" may represent both a noun and a verb. The ontology illustrated by FIG. 1 also includes a second concept where the term "bike" is used as a verb, as in "to bike." As with its noun counterpart, the verb bike 116 concept also includes a set of synonyms 112 that may also be used to represent the same concept. The verb bike 116 is a child of—and therefore has an "is a type of" relationship with—the parent verb "move" 118.

As will be discussed below, when using a universal ontology to map concepts between languages, is often useful to distinguish a concept not only by the word used in that language, but also by the part of speech. As used herein, these concepts are referred to as "lemmas." Lemmas in the universal ontology can be mapped to lemmas in a language-specific ontology by using a mapping engine that connects concepts between various languages. Example mapping engines are discussed below in FIG. 4A-4B. Also, the universal ontology illustrated in FIG. 1 can represent concepts and relationships in a language-independent fashion. While the universal ontology is displayed in English for illustrative purposes only, the language could be used for the universal ontology.

Figure 2A:
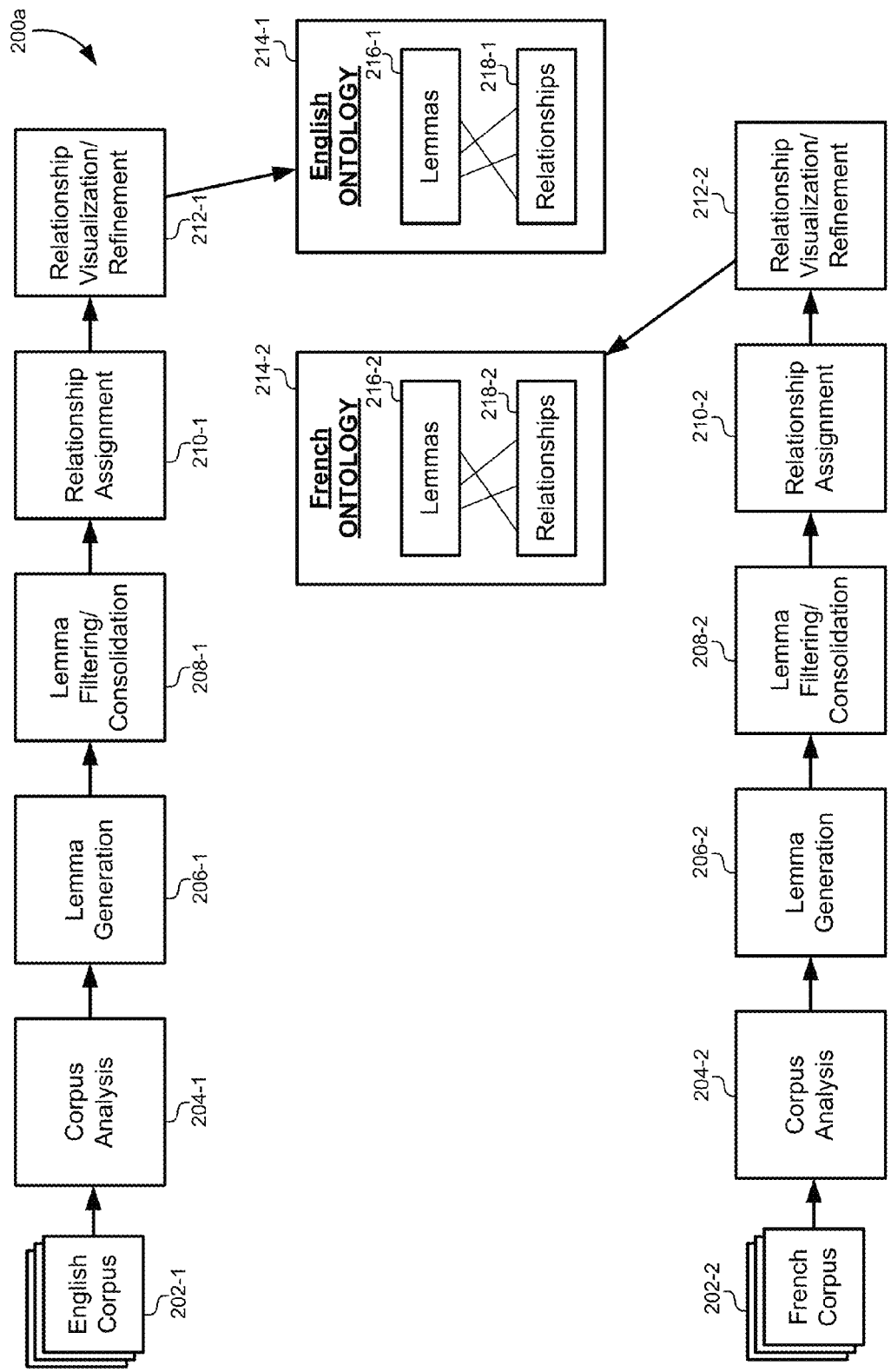
FIG. 2A illustrates parallel language analysis pipelines for generating two different ontologies, according to some embodiments.

FIG. 2A illustrates parallel language analysis pipelines 200a for generating two different ontologies, according to some embodiments. A language analysis pipeline can be used to generate a language-specific ontology from a corpus 202. A corpus may include a web domain, a set of literature, a technical document, and so forth. In general, a corpus is simply a subset of a particular language that is used in a particular context. For example, a corpus may include a web domain for an airline, where terms common to the airline industry are used extensively. By using a particular corpus that is limited to a subset of a general language, an ontology may be derived that is specific to the corpus 202, that is more efficient and smaller than a general language ontology, and that only includes definitions that are specific to the corpus 202, thus speeding up recall and look up efficiency.

Traditionally, two passes through a language-analysis pipeline would be needed to generate to ontologies in different languages. In this example, an English-language-analysis pipeline and a French-language-analysis pipeline would be needed to generate an English ontology 214-1 and a French ontology 214-2, respectively. An English corpus 202-1 and a French corpus 202-2 would need to be provided to the pipelines for analysis. In some cases, the English corpus 202-1 and the French corpus 202-2 could represent the same substantive content in different translations. For example, each corpus 202 could represent the same webpage translated into different languages. To generate the separate ontologies, each corpus needs to be run through a language-analysis pipeline separately.

The process for generating an ontology 214 from a corpus 202 is may proceed as follows. The corpus 202 can be provided to a corpus analysis engine 204 that isolates text of interest within the corpus 202. The corpus analysis engine 204 can remove metadata, comments, display code, and/or other non-substantive text to generate a list of single words that may be considered for the ontology 214. For example, for a web domain, the corpus analysis engine 204 can scrub the HTML formatting code, the developer comments, the metadata, the attributes, and/or the like, and the only text that is displayed on screen to a user for made available to a search engine.

Next, a lemma generation engine 206 can receive the single words and generate lemmas. Lemmas can be made up of single words or combinations of single words forming n-grams. For example, for a website describing an email service, the term "email" would be a single-word lemma, while the term "search filter" would be a two-word lemma referring to a single concept. The lemma generation engine 206 can receive input that defines the maximum and/or minimum number n for generating n-grams. For example, the input could define a minimum number 1 and a maximum number 4 for creating n-grams. The lemma generation engine 206 would then scan the text made available by the corpus analysis engine 204 and generate a list of possible lemmas that occur as consecutive, single- or multi-word combinations in the text.

A lemma filtering/consolidation engine 208 can receive the list of possible lemmas from the lemma generation engine 206 and subsequently pare down the candidate lemmas to generate a final list of lemmas that will appear in the ontology 214. The lemma filtering/consolidation engine 208 may include a number of parameter definitions that can be used to filter the list of candidate lemmas. For example, one parameter may define a usage frequency in the corpus required for a candidate lemma to be retained in the list of ontology lemmas. Candidate lemmas that only occur once or twice in the corpus 202 may be determined to be a grouping of individual words that does not convey a broader meaning or to convey meaning that is not useful in the ontology 214. Thus, candidate lemmas that should be retained may be required to occur at least a minimum number of times in the corpus 202. Other parameters may define dictionaries or other available lemma databases against which the candidate lemmas can be compared. This allows lemmas that match previously known lemmas to be retained and others to be discarded or put through further processing. In some embodiments, the lemma filtering/consolidation engine 208 can generate a display for a user interface such that a user can inspect the list of candidate lemmas before or after any automated filtering process takes place. The user can then quickly scanned the remaining list of candidate lemmas and eliminate any that do not belong.

At this point, a mass of unprocessed text in the corpus 202 has been transformed into a final list of lemmas for the ontology 214. The next to portions of the language-analysis pipeline, the relationship assignment engine 210 and the relationship visualization/refinement engine 212, are often considered to be the most time-consuming and difficult phases of the process. The relationship assignment engine 210 can automatically attempt to generate relationships between the lemmas based on their relative location in the corpus 202, as well as their part of speech, dictionary definition, and known synonyms. The relationship visualization/refinement engine 212 can then be used to display the preliminary relationship assignments to a user in a graphical interface. The user can then visually manipulate the relationships displayed in a graph or tree format on the display device to generate a final set of relationships between the lemmas. The combination of final lemmas 216 and final relationships 218 can then be exported from the language-analysis pipeline as an ontology 214.

In order to generate a French ontology 214-2 and an English ontology 214-1, each step in the language-analysis pipeline must be executed for each individual language. This implies that users may need to manually examine the final lemma list from the lemma filtering/consolidation engine 208, and manually establish the set of final relationships 218. This requires extensive user involvement for generating ontologies, user involvement that will often require expertise in more than one language.

Figure 2B:
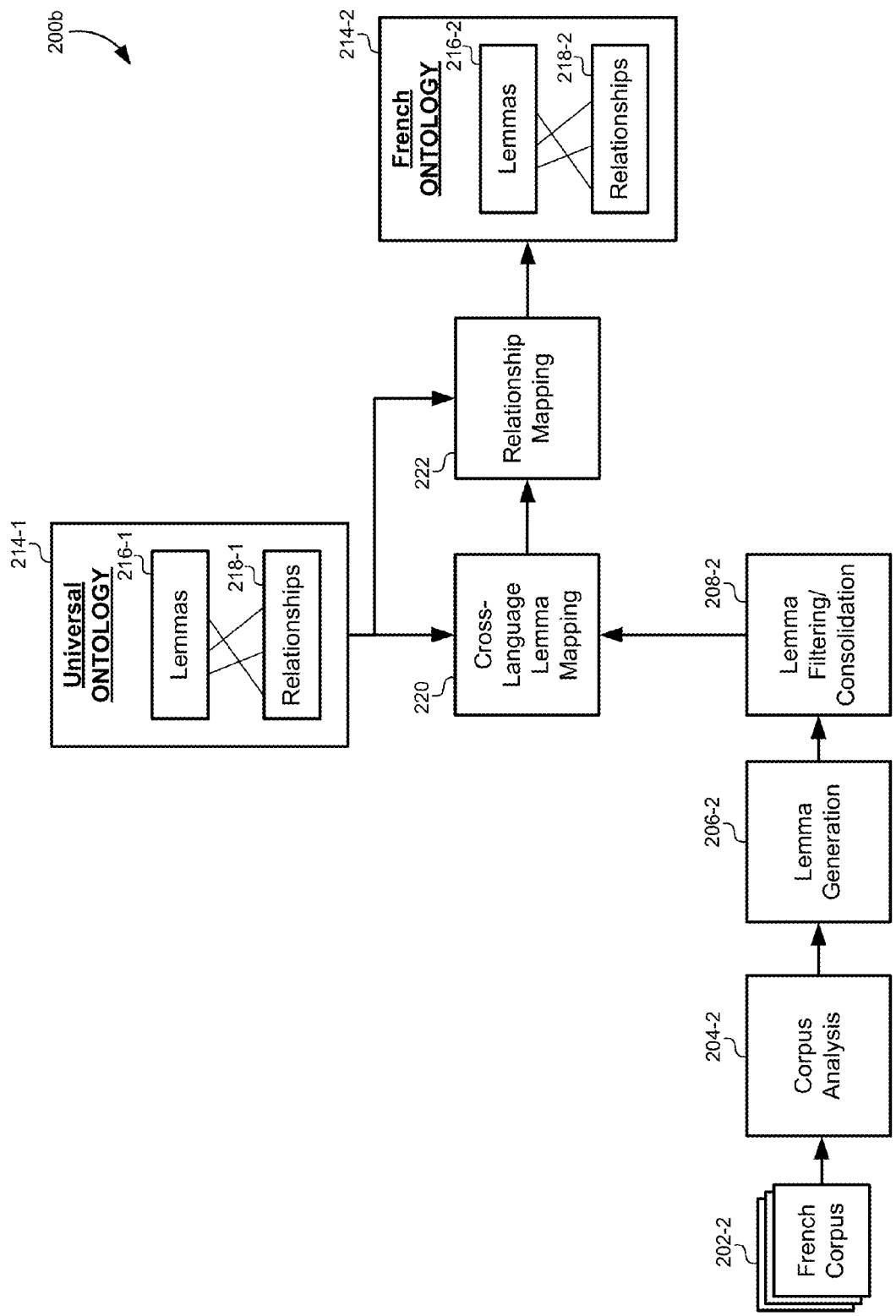
FIG. 2B illustrates a language analysis pipeline using a universal ontology, according to some embodiments.

FIG. 2B illustrates a language analysis pipeline 200b using a universal ontology, according to some embodiments. As described above, the universal ontology 214-1 may be language independent, although it will necessarily be represented by a particular language, such as English. The universal ontology 214-1 will include a set of lemmas 216-1 and a set of relationships 218-1 for the set of lemmas 216-1. In order to generate a French ontology 214-2 from the French corpus 202-2, the universal ontology 214-1 can be used to eliminate the time-consuming steps of generating relationships between French lemmas in the language analysis pipeline.

As described above, the French corpus 202-2 can be analyzed using a corpus analysis engine 204-2, from which the set of lemmas can be generated using the lemma generation engine 206-2. After filtering and editing the candidate lemmas using a lemma filtering/consolidation engine 208-2, a final set of lemmas 216-2 for the French ontology 214-2 will be generated. At this point, a cross-language lemma mapping engine 220 can receive the final set of lemmas 216-2 for the French ontology 214-2 and map the meanings of the final set of lemmas 216-2 to the lemmas 216-1 of the universal ontology 214-1.

Methods used by the cross-language lemma mapping engine 220 to match the final set of lemmas 216-2 for the French ontology 214-2 to the lemmas 216-1 of the universal ontology 214-1 may vary according to the particular embodiment. In some embodiments, the existing databases can be used to link lemmas between languages by linking language specific synsets, or sets of synonym words, to a shared index layer. For example, the Euro WordNet project provides a database that links meanings between concepts of different languages. In other embodiments, an automatic language translation service (e.g., Google translate) can be used to generate cross-language synonyms. For example, a lemma from the final set of lemmas 216-2 can be translated into the language of the universal ontology 214-1 and mapped to a lemma in the lemmas 216-1 of the universal ontology 214-1. In some embodiments, if the language is already been mapped to the universal ontology, the corpus can be used to generate lemmas for which there are parallel data in the universal ontology language. For example, in a parallel corpus, aligned sentences from the new language are mapped directly to parallel sentences in the universal ontology language. Words and multi-token words can be aligned using well-known statistical methods in both languages. Then, the lemmas and mapping can be generated automatically.

After mapping the final set of lemmas 216-2 to lemmas 216-1 in the universal ontology 214-1, the relationships 218-1 in the universal ontology can be directly mapped to the final set of lemmas 216-2 by a relationship mapping engine 222. In many cases, the relationships 218-1 can be directly mapped to the final set of lemmas 216-2 in the French ontology 214-2 in order to generate French-language relationships 218-2. In some cases, lemmas in the final set of lemmas 216-2 of the French ontology 214-2 may not have a direct analog in the lemmas 216-1 of the universal ontology 214-1. This situation will be discussed in greater detail below. In some embodiments, the relationship mapping engine 222 may simply read the relationships from universal ontology 218-1 and apply them directly to the French ontology 214-2, such that the French-language relationships 218-2 are the same as the relationships 218-1 in the universal ontology. If there are any lemmas that cannot be directly mapped between the French language and universal ontology, then additional relationships can be manually added if needed, although this should be a seldom-used operation.

Figure 2C:
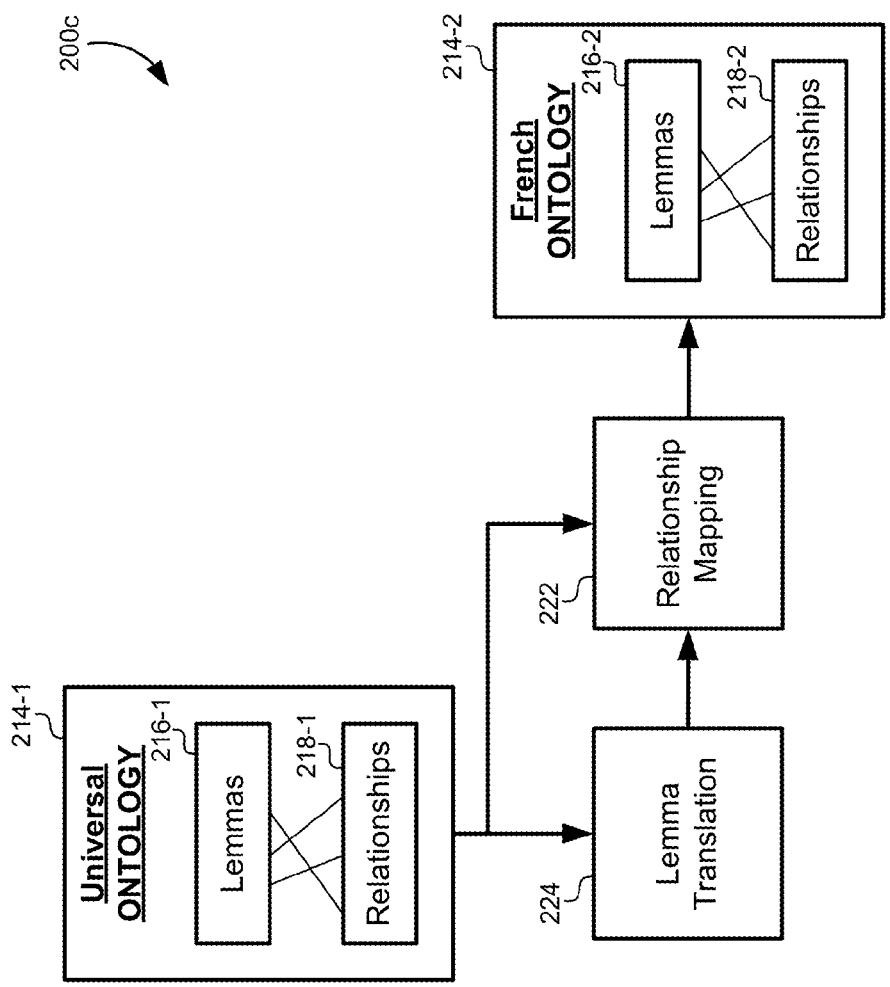
FIG. 2C illustrates a language analysis pipeline using lemma translation, according to some embodiments.

FIG. 2C illustrates a language analysis pipeline 200c using lemma translation, according to some embodiments. In this embodiment, a universal ontology 214-1 can be developed for a specific corpus of material. For example, a master version of a web domain appearing English may be used to generate a universal ontology specific to that particular web domain. As will often be the case for multinational corporations, the master version of the web domain may be translated into various other languages to serve an international customer base. Instead of separately analyzing the translations of the master version of the web domain appearing in English, the universal ontology 214-1 can be used to automatically generate ontologies in the various other languages.

For each of the lemmas 216-1 appearing in the universal ontology 214-1, the lemma translation engine 224 can generate a final set of lemmas 216-2 in another language, such as French. In some cases, the translation of a word in English can result in a set of synonyms that could be used in French. For example, the English word for "bicycle" could generate a set of five synonyms in the French language. The French synonyms can be compared to the actual corpus of the French translation of the web domain to determine which synonym should be used in the French ontology 214-2. After generating the final set of lemmas 216-2 for the French ontology 214-2, the relationship mapping engine 222 can be used to generate the relationships 218-2 for the French ontology 214-2. Note that in this embodiment, the complete French ontology 214-2 was generated based on the universal ontology 214-1 without having to process the French corpus of the web domain in the full language analysis pipeline.

Figure 3A:
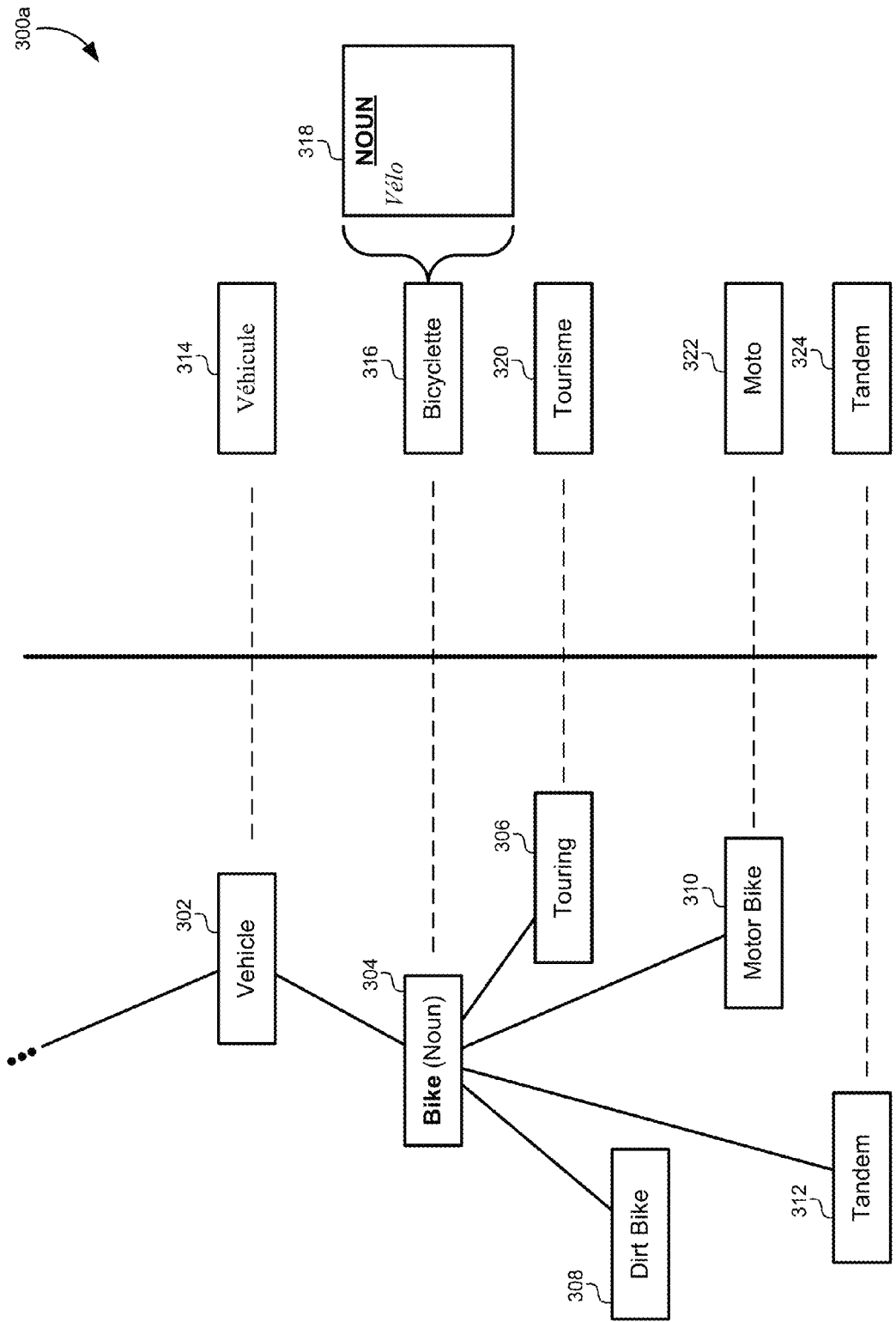
FIG. 3A illustrates a diagram of an ontology during lemma mapping, according to some embodiments.

FIG. 3A illustrates a diagram 300a of an ontology during lemma mapping, according to some embodiments. At this stage of the process, a set of lemmas for the French language may be generated by the language analysis pipeline. For example, a web domain dealing with bike transportation in Paris may have been analyzed to generate the lemmas appearing in FIG. 3A. By translating the language of the French lemmas to the language of the universal ontology (e.g. English), the lemmas of the French language can be mapped to lemmas in the universal ontology. As described above, each lemma concept may have one or more synonyms, which can be used to map concepts between languages. In FIG. 3A, the concepts for a vehicle 302, 314 are mapped, the concepts for a bike 304, 316 are mapped, and the specific types of bikes are mapped, such as a touring bike 306, 320, a motor bike 310, 322, and/or a tandem bike 312, 324.

Note that the concept for a dirt bike 308 does not have an analogous word in the set of French lemmas from the particular Frech corpus. In some embodiments, differences between languages are to be anticipated, and the lemmas in one language may not necessarily line up directly with lemmas in another language.

Figure 3B:
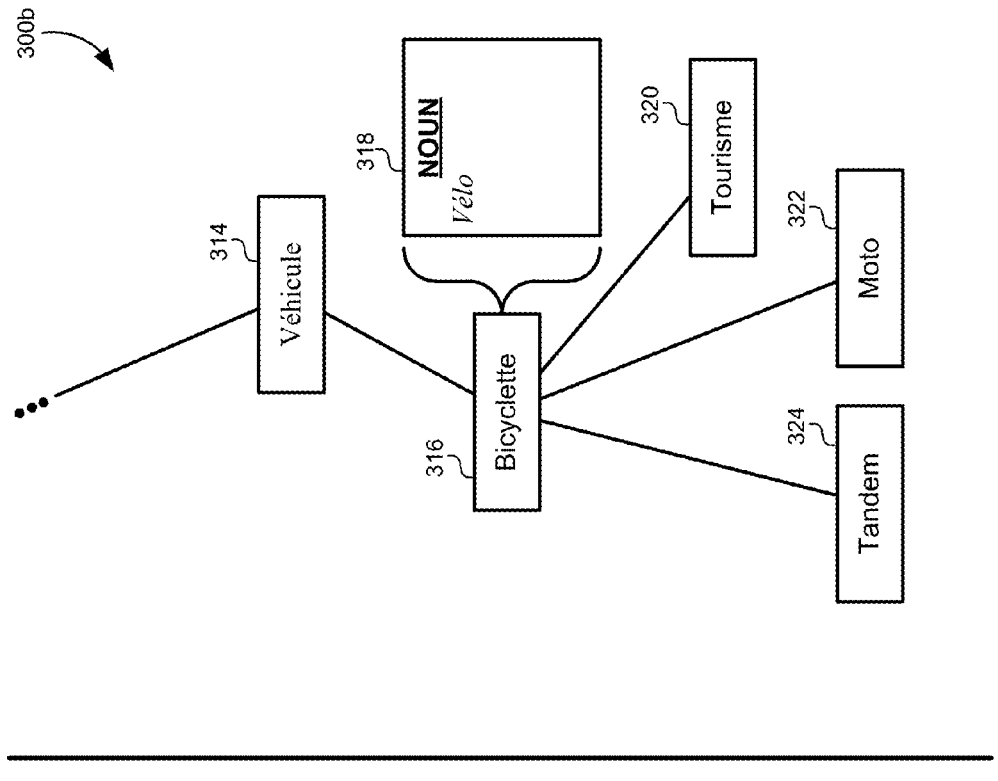
FIG. 3B illustrates a diagram of an ontology during relationship mapping, according to some embodiments.
Figure 3B:
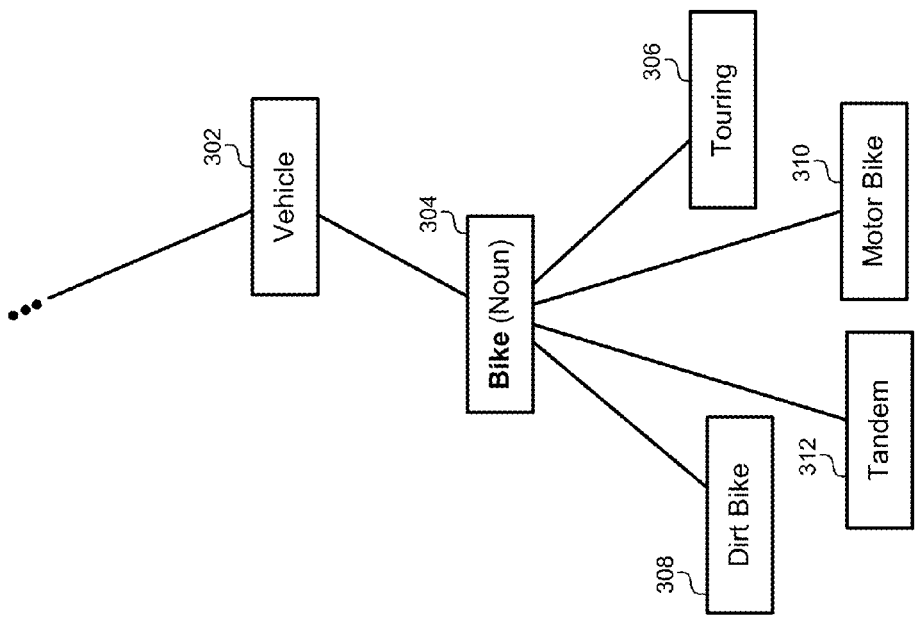

FIG. 3B illustrates a diagram 300b of an ontology during relationship mapping, according to some embodiments. After using the mapped lemmas of FIG. 3B, the relationships between lemmas from the universal ontology can be mapped and duplicated to form the French-language ontology. As illustrated in diagram 300b, the French ontology is established using "is a type of" relationships between the vehicle lemma 314, the bike lemma 316, and so forth. Instead of needing a French-language expert to organize the relationships between the lemmas found in the French corpus, the existing relationships of the universal ontology can be used to automatically generate the corresponding relationships in the French-language ontology.

Figure 4A:
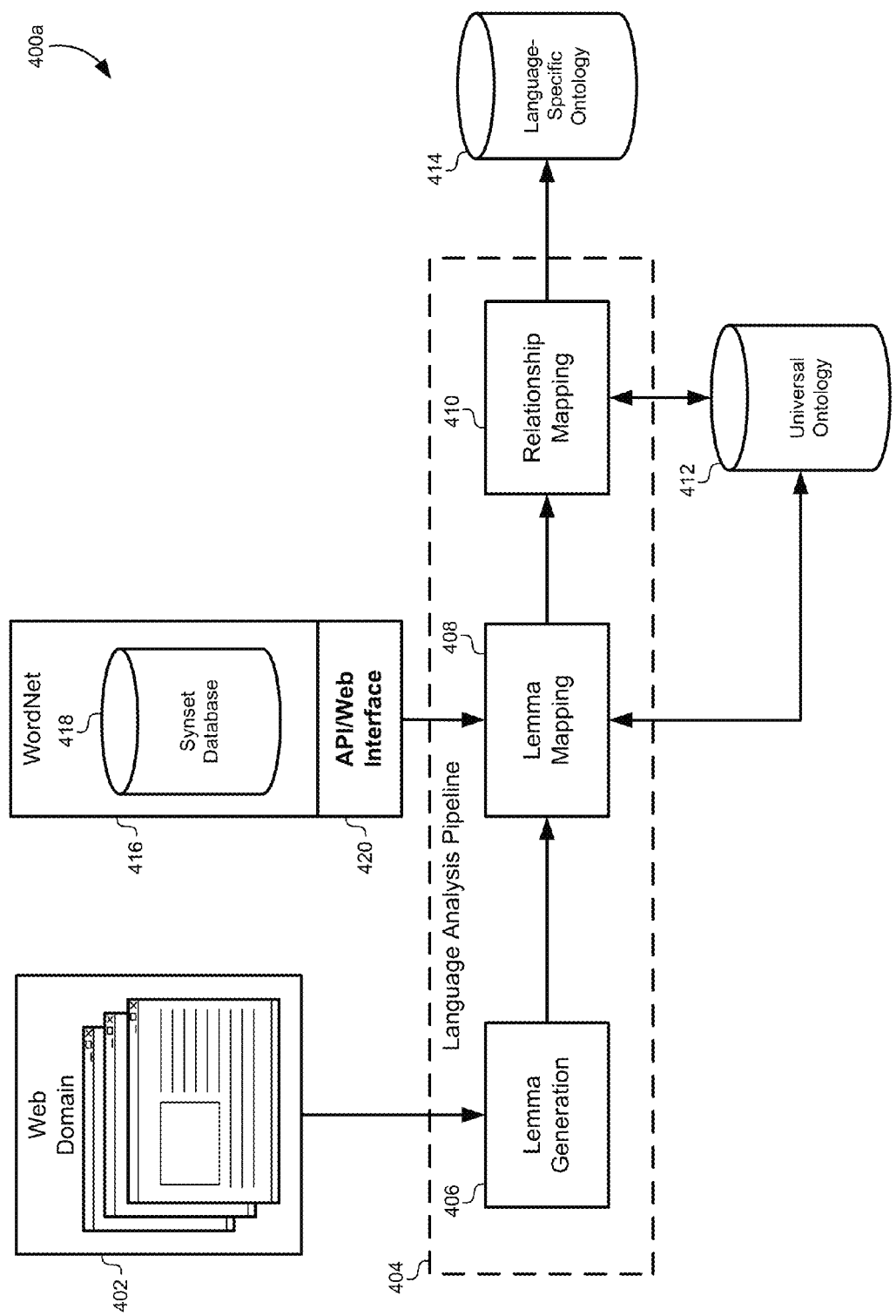
FIG. 4A illustrates a system for generating an ontology using a synonymous word database, according to some embodiments.

FIG. 4A illustrates a system 400a for generating an ontology using a synonymous word database, according to some embodiments. A language analysis pipeline 404 can accept a corpus 402—such as a web domain—as input to generate lemmas 406. The lemma mapping engine 408 can map the generated lemmas to concepts in a universal ontology 412. The lemma mapping engine 408 may also use additional resources to mapped to lemmas, such as a commercially available or proprietary synonymous word database 416 that maps concepts between languages. The lemma mapping engine 408 can access the database 416 through an API or web interface 420. Next, the relationship mapping engine 410 can reuse relationships from the universal ontology 412 to generate a final language specific ontology 414 as described above.

Figure 4B:
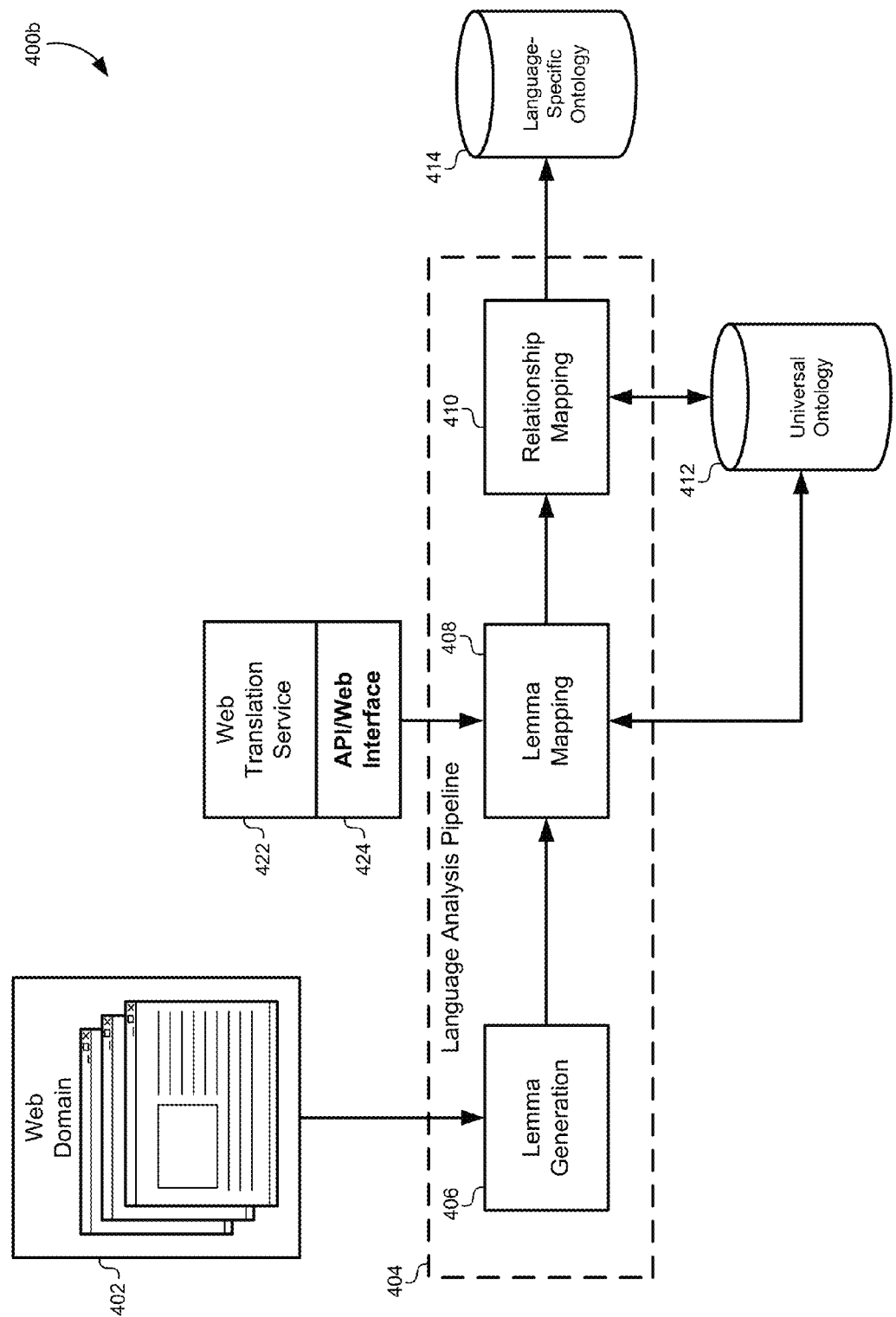
FIG. 4B illustrates a system for generating an ontology using a language translation service database, according to some embodiments.

FIG. 4B illustrates a system 400b for generating an ontology using a language translation service database, according to some embodiments. The embodiment of system 400b is similar to that of system 400a, the difference being that the API or web interface 424 uses a web translation service 422 for generating mappings between the lemmas of the corpus 402 and the lemmas of the universal ontology 412.

Figure 5:
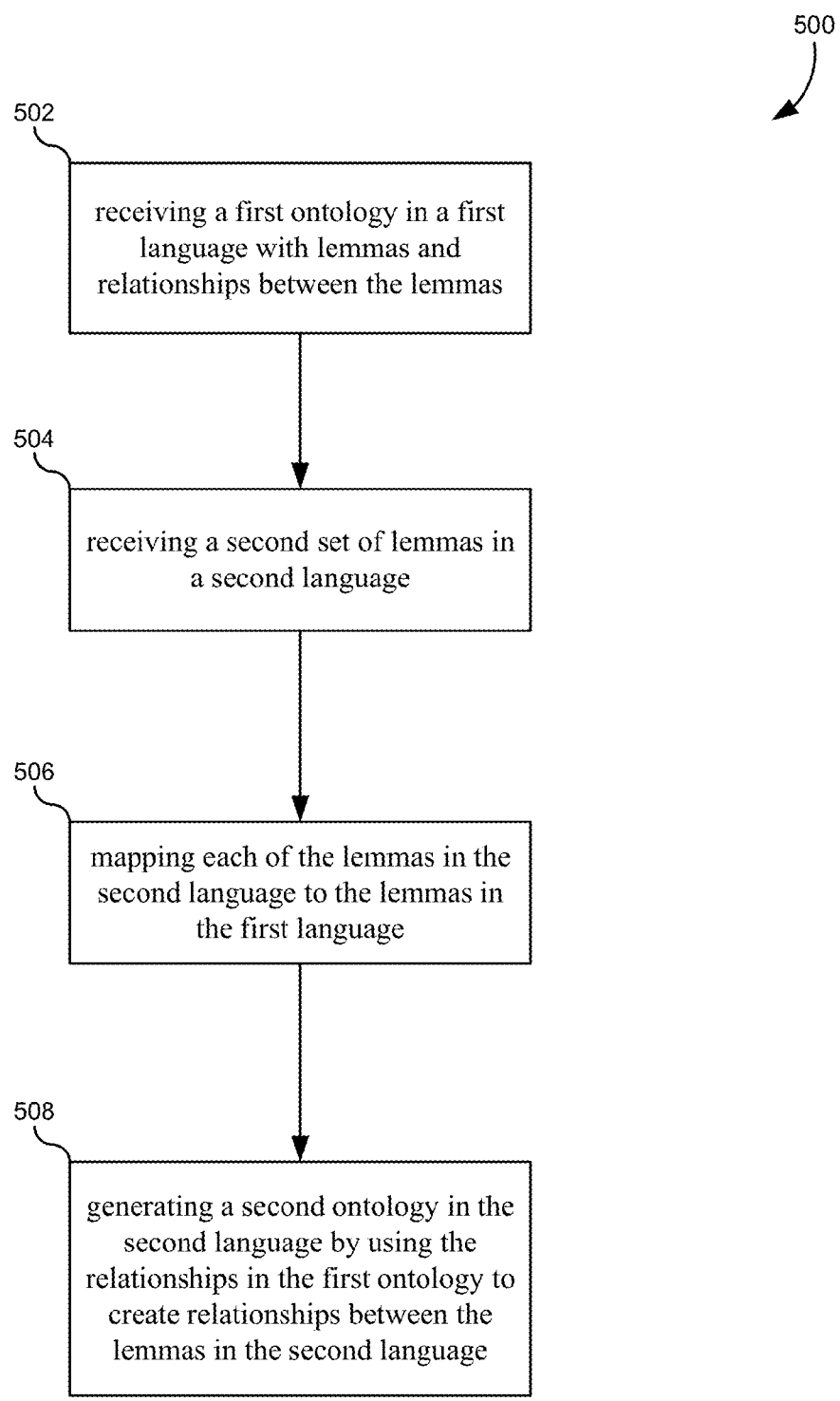
FIG. 5 illustrates a flowchart of a method for generating ontologies for use in natural language processing, according to some embodiments.

FIG. 5 illustrates a flowchart 500 of a method for generating ontologies for use in natural language processing, according to some embodiments. The method may include receiving a first ontology in a first language with lemmas and relationships between the lemmas (502). The first ontology may be a language-independent set of lemma concepts linked together with relationships. The first ontology may be specific to a particular corpus, such as a web domain or a set of documents. In some embodiments, the first ontology may be generated using a language analysis pipeline that extracts and filters lemmas from a corpus and receives relationships between lemmas from a language expert.

The method may also include receiving a second set of lemmas in a second language (504). The second language may be different from the first language used to express the first, or universal, ontology. The second set of lemmas may be generated from a language analysis pipeline in a manner similar to how the lemmas of the first ontology were generated. In some embodiments, the corpus for the second set of lemmas in the corpus of the first ontology may be derived from the same corpus in different languages. The method may additionally include mapping each of the lemmas in the second language to the lemmas in the first language (506). This step may be accomplished by translating the lemmas in the second language into a set of synonyms in the first language, and then identifying synonyms that appear in the lemmas in the first ontology. Finally, the method may further include generating a second ontology in the second language by using the relationships in the first ontology to create relationships between the lemmas in the second language (508).

It should be appreciated that the specific steps illustrated in FIG. 5 provide particular methods of generating ontologies from a universal ontology according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 6:
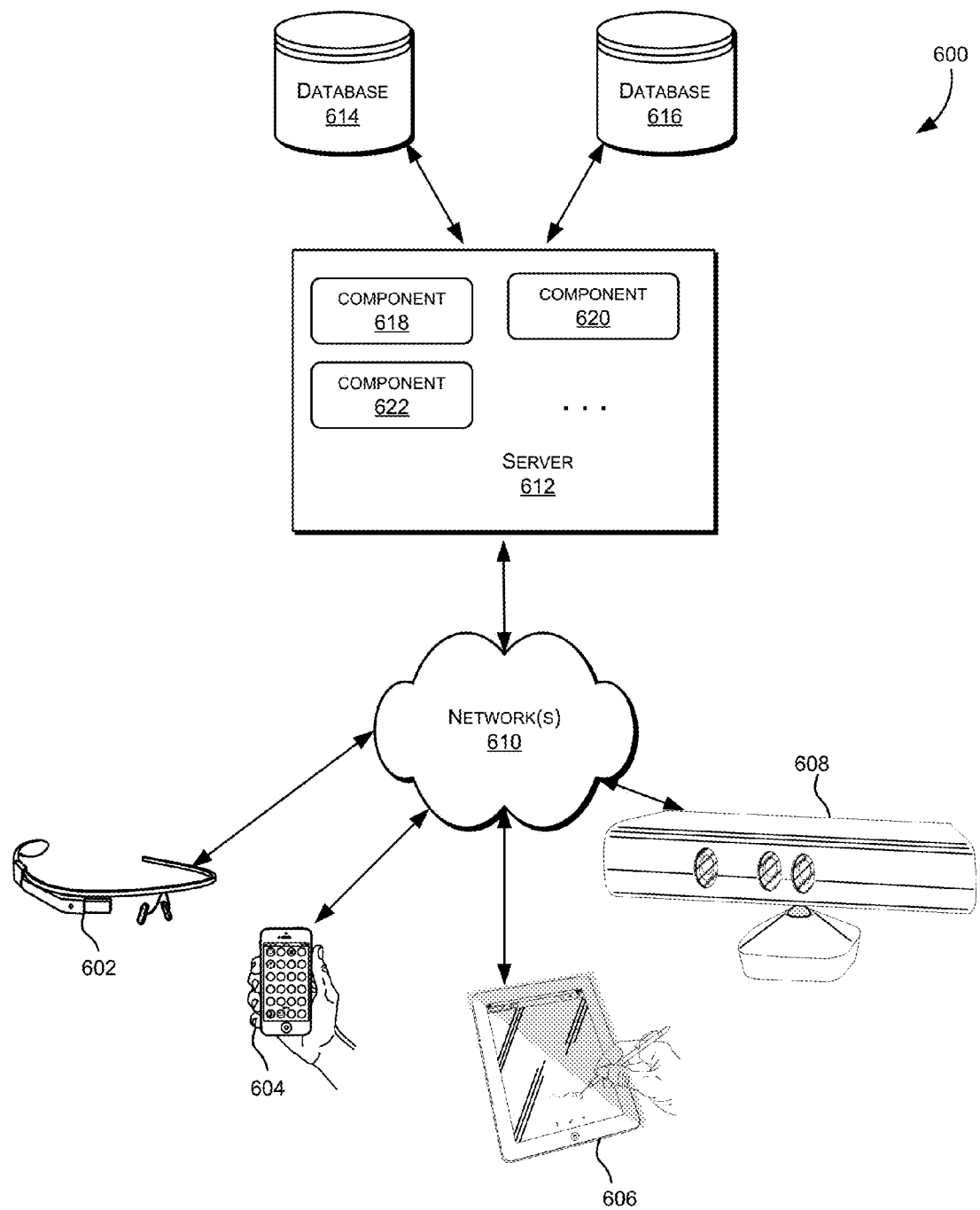
FIG. 6 illustrates a simplified block diagram of a distributed system for implementing some of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
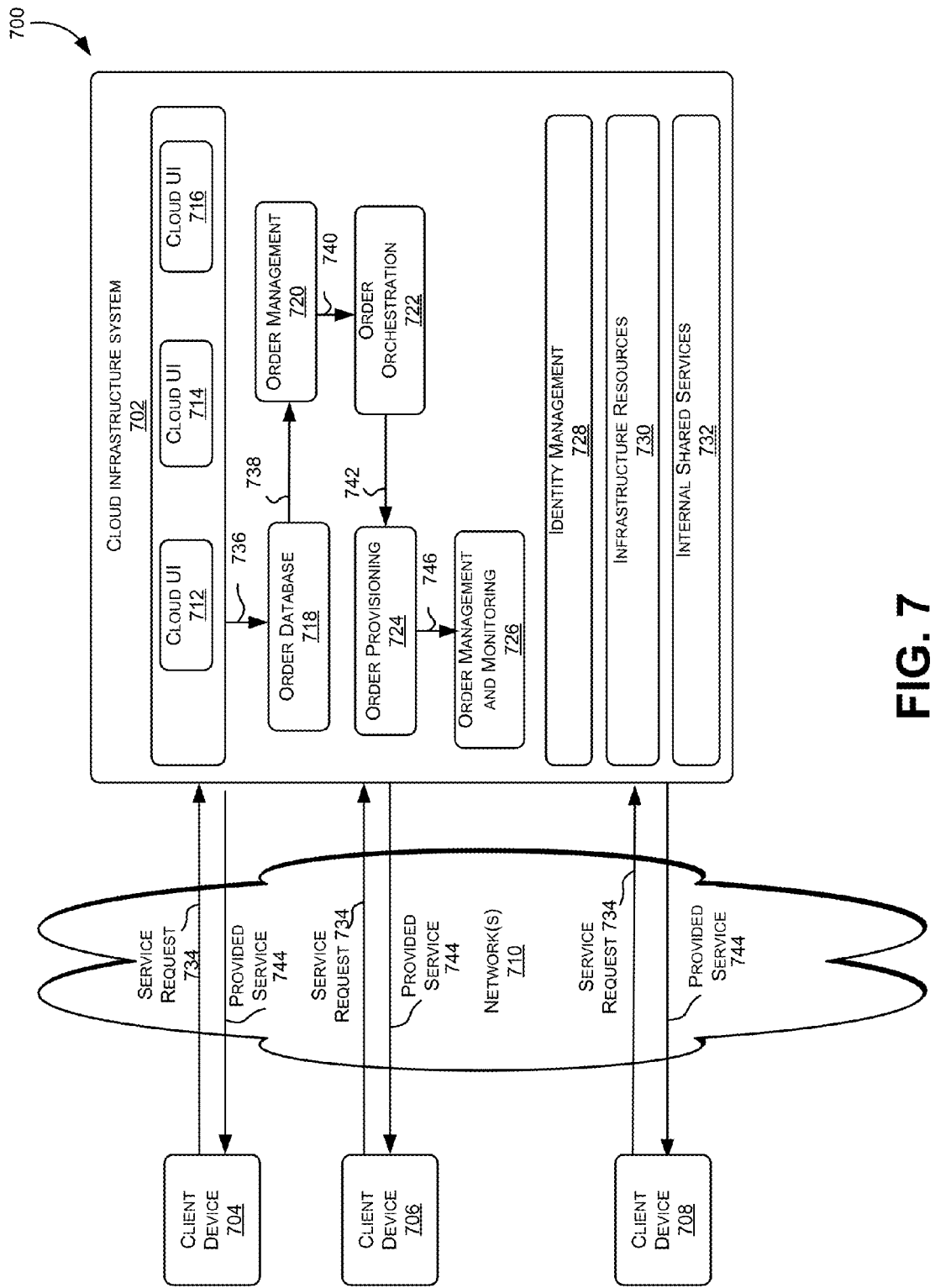
FIG. 7 illustrates a simplified block diagram of components of a system environment by which services provided by the components of an embodiment system may be offered as cloud services.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system

702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
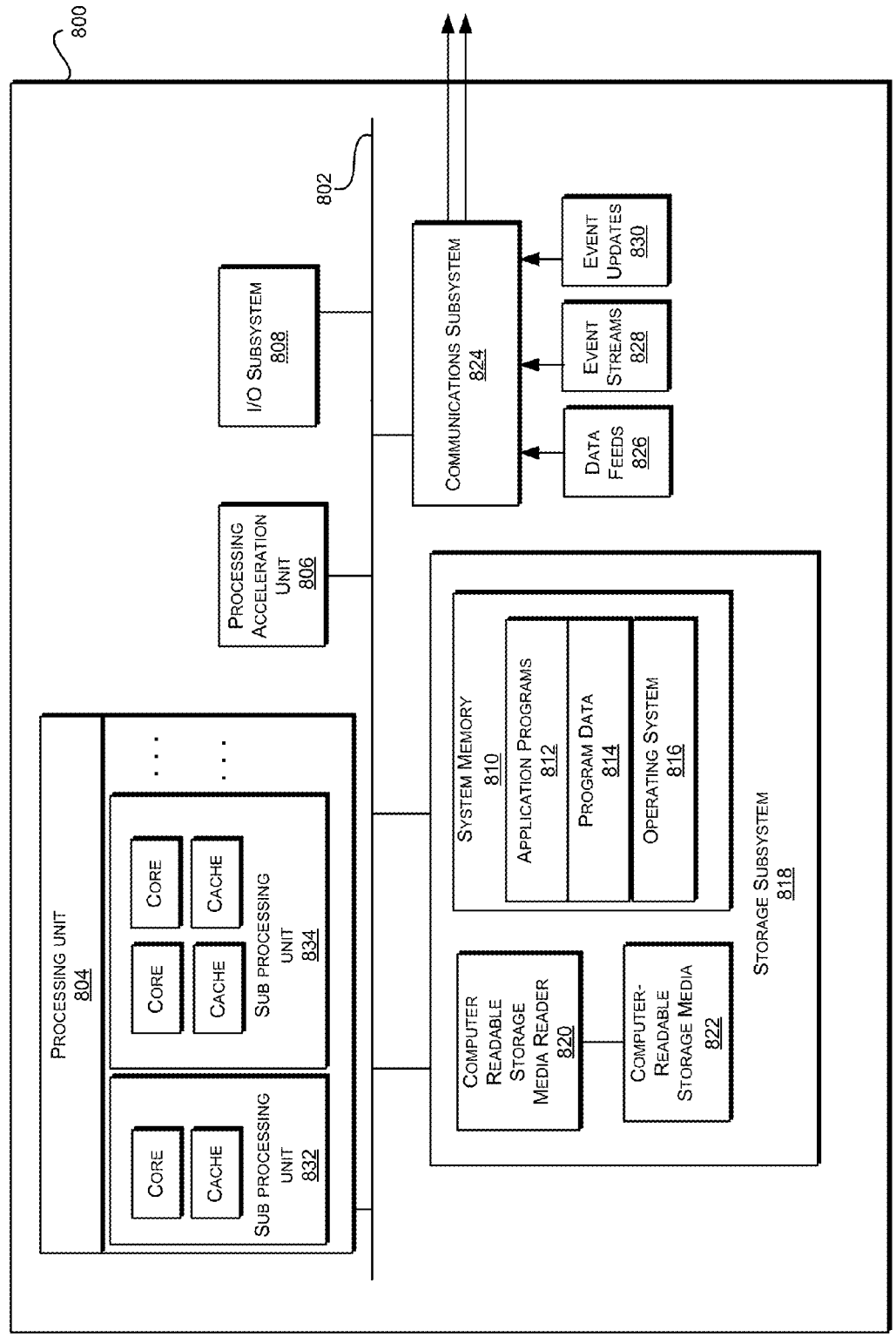
FIG. 8 illustrates an exemplary computer system, in which various embodiments may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Sirit navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of mapping computer domain ontologies between languages, the method comprising:
   receiving, using a computer system, a first ontology in a first language, wherein the first ontology is comprised of a first plurality of lemmas and a plurality of relationships between the plurality of lemmas;
   receiving, using the computer system, a second plurality of lemmas in a second language;
   mapping, using the computer system, each of the second plurality of lemmas in the second language to a respective lemma in the first plurality of lemmas in the first language; and
   linking, using the computer system, the second plurality of lemmas together using the plurality of relationships in the first ontology as a template to create relationships between the second plurality of lemmas in the second language; and
   generating, using the computer system, a second ontology comprising:
      the second plurality of lemmas; and
      the relationships between the second plurality of lemmas.

2. The method of claim 1, wherein the first ontology comprises a language independent ontology that encodes relationships between concepts that are represented by the first plurality of lemmas.

3. The method of claim 1, wherein the second plurality of lemmas are generated from a version of a web domain in the second language.

4. The method of claim 3, wherein the first plurality of lemmas are generated from a version of the web domain in the first language.

5. The method of claim 1, wherein the second plurality of lemmas comprise n-grams less than a predetermined length that occur in a corpus at least a predetermined number of times.

6. The method of claim 1, wherein the plurality of relationships of the first ontology are directly inserted into the second ontology.

7. The method of claim 1, wherein mapping each of the second plurality of lemmas in the second language to a respective lemma in the first plurality of lemmas in the first language comprises translating the second plurality of lemmas in the second language into the first language.

8. A non-transitory, computer-readable medium comprising instructions which, when executed by one or more processors, causes the one or more processors to perform operations comprising:
   receiving a first ontology in a first language, wherein the first ontology is comprised of a first plurality of lemmas and a plurality of relationships between the plurality of lemmas;
   receiving a second plurality of lemmas in a second language;
   mapping each of the second plurality of lemmas in the second language to a respective lemma in the first plurality of lemmas in the first language; and
   linking the second plurality of lemmas together using the plurality of relationships in the first ontology as a template to create relationships between the second plurality of lemmas in the second language; and
   generating a second ontology comprising:
      the second plurality of lemmas; and
      the relationships between the second plurality of lemmas.

9. The non-transitory, computer-readable medium of claim 8, wherein the first ontology comprises a language independent ontology that encodes relationships between concepts that are represented by the first plurality of lemmas.

10. The non-transitory, computer-readable medium of claim 8, wherein the second plurality of lemmas are generated from a version of a web domain in the second language.

11. The non-transitory, computer-readable medium of claim 10, wherein the first plurality of lemmas are generated from a version of the web domain in the first language.

12. The non-transitory, computer-readable medium of claim 8, wherein the second plurality of lemmas comprise n-grams less than a predetermined length that occur in a corpus at least a predetermined number of times.

13. The non-transitory, computer-readable medium of claim 8, wherein the plurality of relationships of the first ontology are directly inserted into the second ontology.

14. The non-transitory, computer-readable medium of claim 8, wherein mapping each of the second plurality of lemmas in the second language to a respective lemma in the first plurality of lemmas in the first language comprises translating the second plurality of lemmas in the second language into the first language.

15. A system comprising:
one or more processors; and
one or more memory devices comprising instructions which, when executed by the one or more processors, cause the one or more processors to perform operations comprising:
  receiving a first ontology in a first language, wherein the first ontology is comprised of a first plurality of lemmas and a plurality of relationships between the plurality of lemmas;
  receiving a second plurality of lemmas in a second language;
  mapping each of the second plurality of lemmas in the second language to a respective lemma in the first plurality of lemmas in the first language; and
  linking the second plurality of lemmas together using the plurality of relationships in the first ontology as a template to create relationships between the second plurality of lemmas in the second language; and
  generating a second ontology comprising:
    the second plurality of lemmas; and
    the relationships between the second plurality of lemmas.

16. The system of claim 15, wherein the first ontology comprises a language independent ontology that encodes relationships between concepts that are represented by the first plurality of lemmas.

17. The system of claim 15, wherein the second plurality of lemmas are generated from a version of a web domain in the second language.

18. The system of claim 17, wherein the first plurality of lemmas are generated from a version of the web domain in the first language.

19. The system of claim 15, wherein the second plurality of lemmas comprise n-grams less than a predetermined length that occur in a corpus at least a predetermined number of times.

20. The system of claim 15, wherein the plurality of relationships of the first ontology are directly inserted into the second ontology.

* * * * *

UNITED STATES PATENT AND TRADEMARK OFFICE
CERTIFICATE OF CORRECTION

PATENT NO. : 9,582,493 B2
APPLICATION NO. : 14/793658
DATED : February 28, 2017
INVENTOR(S) : Fabrice Nauze, Geert Kloosterman and Albert Derk Eduard Vedelaar Page 1 of 1

It is certified that error appears in the above-identified patent and that said Letters Patent is hereby corrected as shown below:

On the Title Page

Item [72]:
Delete "Sleidrecht" and replace with --Sliedrecht--

In the Specification

Column 1, Line 17:
Delete "14/7793,677" and replace with --14/793,677--

Column 4, Line 37:
Delete "Is" and replace with --It is--

Column 6, Line 12:
Delete "next to" and replace with --next two--

Column 8, Line 23:
Delete "Frech" and replace with --French--

Column 17, Line 45:
Delete "Sirit" and replace with --Siri®--

Signed and Sealed this
Eighteenth Day of September, 2018

Andrei Iancu
*Director of the United States Patent and Trademark Office*